United States Patent [19]

Kumita

[11] Patent Number: 5,894,204

[45] Date of Patent: Apr. 13, 1999

[54] SPINDLE MOTOR CONTROL METHOD AND DISK UNIT

[75] Inventor: Hiroshi Kumita, Kawasaki, Japan

[73] Assignee: Fujitsu Limited, Kawasaki, Japan

[21] Appl. No.: 09/022,861

[22] Filed: Feb. 12, 1998

[30] Foreign Application Priority Data

Jul. 23, 1997 [JP] Japan .................... 9-197166

[51] Int. Cl.$^6$ .................................... H02K 7/10
[52] U.S. Cl. .................... 318/364; 318/63; 318/65; 318/86; 318/362; 318/366
[58] Field of Search ..................... 318/60, 63, 65, 318/86, 362, 364, 366

[56] References Cited

U.S. PATENT DOCUMENTS

| | | | |
|---|---|---|---|
| 4,794,311 | 12/1988 | Kiya et al. | 318/364 X |
| 5,184,049 | 2/1993 | Kiuchi | 318/362 |
| 5,784,990 | 7/1998 | Shimizu et al. | 318/364 X |

FOREIGN PATENT DOCUMENTS

| | | |
|---|---|---|
| 55-163651 | 12/1980 | Japan . |
| 62-18654 | 1/1987 | Japan . |
| 3-69049 | 3/1991 | Japan . |
| 5-198082 | 8/1993 | Japan . |
| 5-274785 | 10/1993 | Japan . |

*Primary Examiner*—Karen Masih
*Attorney, Agent, or Firm*—Greer, Burns & Crain, Ltd.

[57] ABSTRACT

A spindle motor control method stops a spindle motor which rotates in a forward direction in response to a rotation signal. The spindle motor control method includes two steps. First, a brake signal is supplied to the spindle motor for rotating the spindle motor in a reverse direction when stopping the spindle motor which rotates in the forward direction. Second, the rotation signal and the brake signal are put in an OFF state when a frequency generator signal FG, which indicates a rotational phase of the spindle motor and is generated based on an output of the spindle motor, is not detected for a predetermined time.

12 Claims, 10 Drawing Sheets

SPINDLE MOTOR CONTROL METHOD AND DISK UNIT

BACKGROUND OF THE INVENTION

The present invention generally relates to spindle motor control methods and disk units, and more particularly to a spindle motor control method for positively stopping rotation of a spindle motor and to a disk unit which employs such a spindle motor control method.

In disk units such as magnetic disk units, optical disk units and magneto-optic disk units, a spindle motor rotates a recording medium such as a magnetic disk, optical disk and magneto-optic disk. The spindle motor rotates the disk during operation of the disk unit, but in a power save mode or the like, the spindle motor is stopped in order to reduce the power consumption. In addition, when the disk is loaded into the disk unit, the disk is mounted on a spindle which is rotated by the spindle motor. On the other hand, when unloading the disk from the disk unit, the disk is removed from the spindle. There is a possibility of a recording surface of the disk from becoming damaged if the spindle rotates while loading and unloading the disk to and from the disk unit, and for this reason, the spindle motor is stopped when loading and unloading the disk to and from the disk unit.

When stopping the spindle motor, there is a demand to positively stop the rotation of the spindle motor within a short time from a start of a stop operation. If the rotation of the spindle motor actually does not stop completely even when the stop operation is carried out, there is a possibility of damaging the disk when loading and unloading the disk to and from the disk unit. Furthermore, if it takes time for the actual rotation of the spindle motor to completely stop after the start of the stop operation, it takes that much time to load and unload the disk to and from the disk unit in a case where the loading and unloading of the disk is prohibited until the rotation of the spindle motor comes to a complete stop, and the operation characteristic of the disk unit becomes poor.

Conventionally, there is a spindle motor which is provided with a Hall element for detecting the rotation of the spindle motor. According to this spindle motor, a brake signal is supplied to the spindle motor based on a rotation detection signal which is detected by use of the Hall element, so as to stop the rotation of the spindle motor. It is possible to judge whether or not the spindle motor is stopped based on the rotation detection signal.

But recently, in order to reduce the cost of the spindle motor, there are disk units which use a type of spindle motor which is not provided with a Hall element. For this reason, it is impossible to judge whether or not this type of spindle motor is stopped based on the rotation detection signal described above.

Hence, in the case of this type of spindle motor which is not provided with a Hall element, there is no means of detecting whether or not the spindle motor is stopped, and a brake signal is turned ON/OFF by use of a timer or the like when stopping the spindle motor.

However, when the brake signal is supplied to the spindle motor when stopping the spindle motor which is undergoing a steady state rotation, there was a problem in that it is impossible to positively and accurately stop the spindle motor by simply turning the brake signal ON/OFF by determining a brake time by use of the timer or the like, because a deceleration value at an initial stage of the brake time slightly differs for each individual spindle motor. In addition, since the characteristic of the spindle motor is temperature dependent, there was also a problem in that an accurate brake time cannot be obtained when a temperature change occurs. In these cases, because an appropriate brake time cannot be obtained, the spindle motor continues to rotate in a forward direction due to inertia if the brake time is too short, and the spindle motor starts to rotate in a reverse direction due to inertia if the brake time is too long.

Conventionally, the possibility of the spindle motor slightly rotating due to inertia is taken into consideration, and after the supply of the brake signal to the spindle motor is stopped, the spindle motor is regarded stopped after a predetermined time elapses from the stop of the brake signal supply by use of a timer. As a result, there was a problem in that it takes time to detect the stop of the spindle motor, and when this spindle motor is applied to the disk unit, there was a problem in that the operation characteristic of the disk unit becomes poor when loading and unloading the disk to and from the disk unit.

SUMMARY OF THE INVENTION

Accordingly, it is a general object of the present invention to provide a novel and useful spindle motor control method and disk unit in which the problems described above are eliminated.

Another and more specific object of the present invention is to provide a spindle motor control method and a disk unit which can positively stop a spindle motor within a short time.

Still another object of the present invention is to provide a spindle motor control method for stopping a spindle motor which rotates in a forward direction in response to a rotation signal, comprising the steps of (a) supplying to the spindle motor a brake signal for rotating the spindle motor in a reverse direction when stopping the spindle motor which rotates in the forward direction, and (b) putting the rotation signal and the brake signal to an OFF state when a frequency generator signal FG which indicates a rotational phase of the spindle motor and is generated based on an output of the spindle motor is not detected for a predetermined time. According to the spindle motor control method of the present invention, it is possible to positively stop the spindle motor within a short time regardless of the state of the spindle motor.

A further object of the present invention is to provide a disk unit comprising a spindle motor rotating a disk, a driver circuit controlling driving of the spindle motor and outputting a frequency generator signal FG which indicates a rotational phase of the spindle motor based on an output of the spindle motor, and a controller supplying to the driver circuit a rotation signal for rotating the spindle motor in a forward direction and a brake signal for reversing a rotating direction of the spindle motor, and controlling rotation and stop of the spindle motor, wherein the controller supplies the brake signal to the driver circuit when stopping the spindle motor which rotates in the forward direction, and puts both the rotation signal and the brake signal to a OFF state when the frequency generator signal FG is not detected for a predetermined time. According to the disk unit of the present invention, it is possible to positively stop the spindle motor within a short time regardless of the state of the spindle motor within the disk unit. For this reason, it is possible to improve the operation characteristic of the disk unit particularly when loading and unloading the disk to and from the disk unit.

Other objects and further features of the present invention will be apparent from the following detailed description when read in conjunction with the accompanying drawings.

DESCRIPTION OF THE PREFERRED EMBODIMENTS

Figure 1:
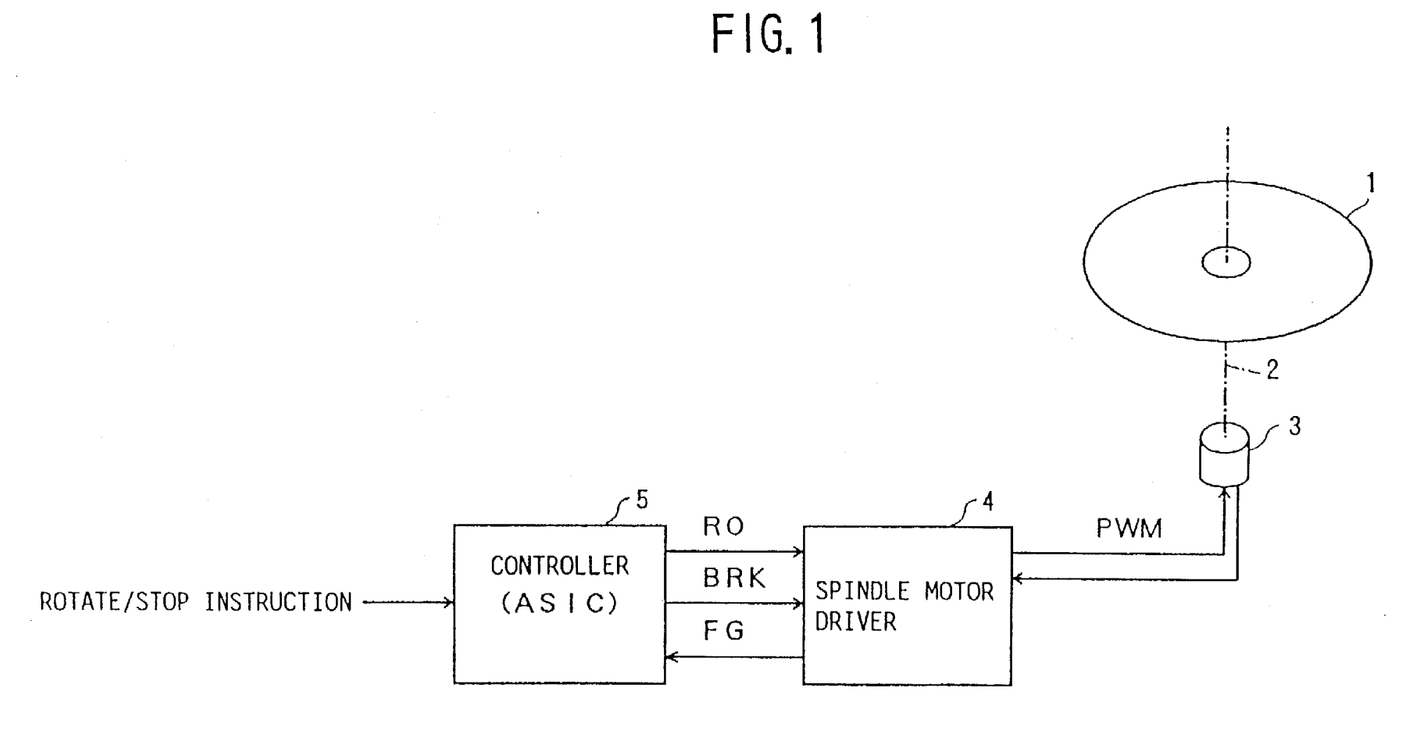
FIG. 1 is a system block diagram showing the general construction of a spindle motor control system of an embodiment of a disk unit according to the present invention.

FIG. 1 is a system block diagram showing the general construction of a spindle motor control system of an embodiment of a disk unit according to the present invention. In this embodiment of the disk unit, the present invention is applied to an optical disk unit which employs an embodiment of a spindle motor control method according to the present invention.

In FIG. 1, an optical disk 1 is mounted on a spindle 2 which is rotated by a spindle motor 3. The spindle motor 3 is controlled by a spindle motor driver 4 and a controller 5. The controller 5 is made of a central processing unit (CPU), for example, and generates a rotation signal RO and a brake signal BRK based on an external rotate/stop instruction and a frequency generator signal FG from the spindle motor driver 4. The rotation signal RO indicates the start of the rotation of the spindle motor 3 or that the spindle motor 3 is rotating. The controller 5 supplies the generated rotation signal RO and the brake signal BRK to the spindle motor driver 4. For example, the rotate/stop instruction is supplied to the controller 5 from a host unit (not shown) or an operation panel (not shown). When starting a forward rotation of the spindle motor 3 in order to make the spindle motor 3 undergo a steady state rotation, the controller 5 sets the rotation signal RO to a high level and sets the brake signal BRK to a low level, based on the rotation instruction. The spindle motor driver 4 generates a driving signal PWM based on the high-level rotation signal RO and the low-level brake signal BRK which are received from the controller 5. The spindle motor driver 4 supplies the generated driving signal PWM to the spindle motor 3 so as to control and rotate the spindle motor 3 to undergo the steady state rotation.

When stopping the spindle motor 3 in this state, the controller 5 sets the brake signal BRK to a high level based on the stop instruction. The spindle motor driver 4 generates a driving signal PWM based on the high-level rotation signal RO and the high-level brake signal BRK which are received from the controller 5. The spindle motor driver 4 supplies the generated driving signal PWM to the spindle motor 3 so as to control the spindle motor 3 to start a reverse rotation. As a result, the spindle motor 3 is braked, and the controller 5 thereafter generates and supplies low-level rotation signal RO and a low-level brake signal BRK to the spindle motor driver 4, so as to put the spindle motor 3 to a stopped state.

Figure 2:
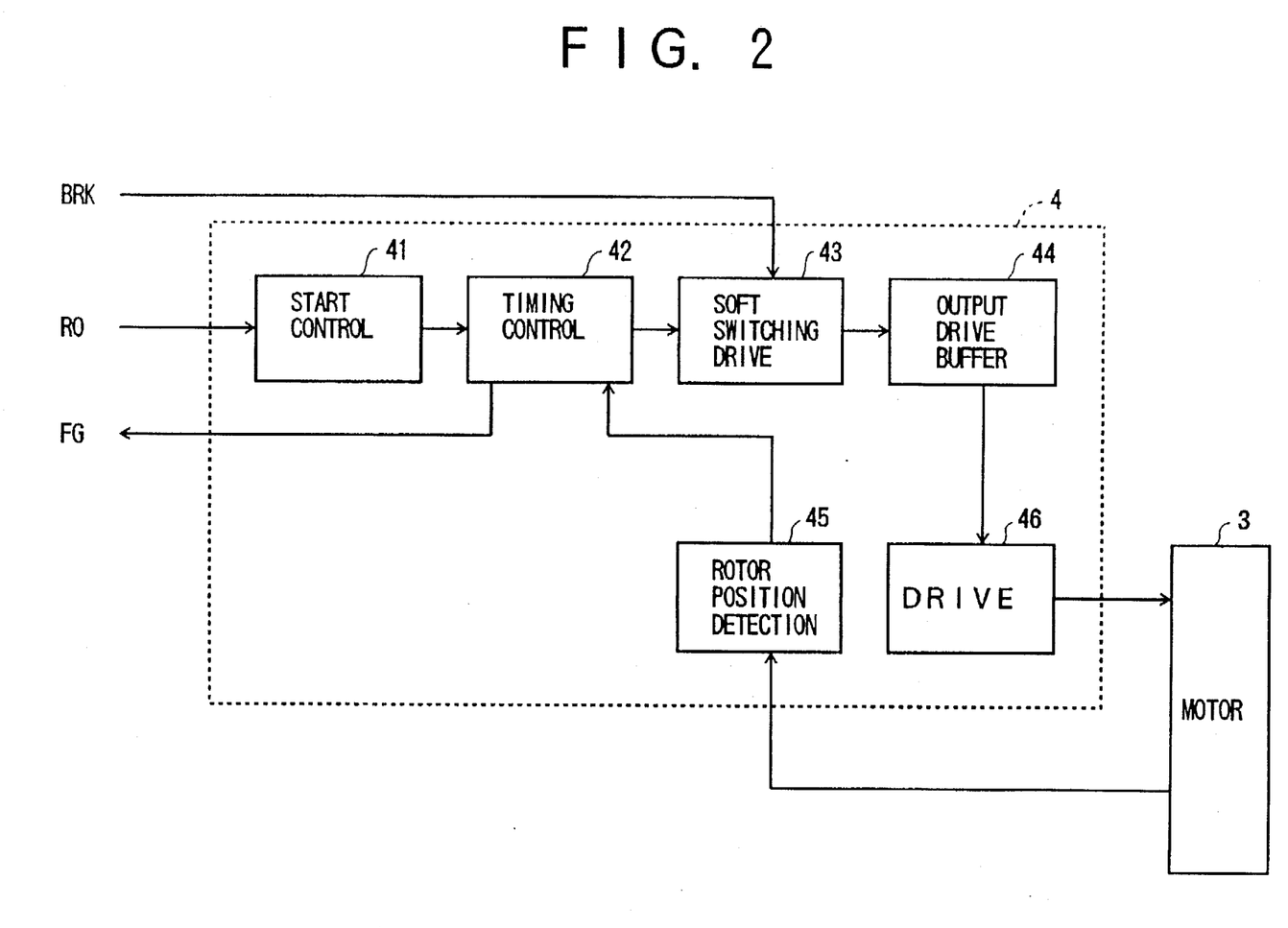
FIG. 2 is a system block diagram showing the construction of a spindle motor driver.

FIG. 2 is a system block diagram showing the construction of the spindle motor driver 4. The spindle motor driver 4 generally includes a start control circuit 41, a timing control circuit 42, a soft switching drive circuit 43, an output drive buffer circuit 44, a rotor position detection circuit 45, and a drive circuit 46 which are connected as shown in FIG. 2. For example, an integrated circuit (IC) TPIC1304 manufactured by Japan Texas Instruments may be used as the spindle motor driver 4 having the above described construction.

The start control circuit 41 sets a rotating direction at a start of the spindle motor 3 based on the rotation signal RO from the controller 5, and supplies a signal which indicates the set rotating direction to the timing control circuit 42. The rotor position detection circuit 45 detects a rotary position of a rotor of the spindle motor 3 based on signals of 3 phases U, V and W obtained from the spindle motor 3, and supplies a signal indicating the rotary position of the rotor to the timing control circuit 42. The timing control circuit 42 generates a timing signal for controlling a timing with which a current applied to each of the phases U, V and W of the spindle motor 3 is switched, based on the signals from the start control circuit 41 and the rotor position detection circuit 45, and supplies the timing signal to the soft switching drive circuit 43. In addition, the timing control circuit 42 generates a frequency generator signal FG which indicates the rotational phase of the spindle motor 3, based on the signal from the rotor position detection circuit 45, and supplies the frequency generator signal FG to the controller 5 shown in FIG. 1.

The soft switching drive circuit 43 is provided to eliminate a spike noise which is generated when switching the current applied to each of the phases U, V and W of the spindle motor 3. When stopping the spindle motor 3 which is undergoing a steady state rotation, the soft switching drive circuit 43 generates a signal indicating a reverse switching timing, based on the high-level brake signal BRK obtained from the controller 5 shown in FIG. 1 and the timing signal obtained from the timing control circuit 42. The output drive buffer circuit 44 controls ON/OFF states of each of transistors within the drive circuit 46, based on the output signal of the soft switching drive circuit 43. The drive circuit 46 controls an output current depending on the signal obtained from the output drive buffer circuit 44, so as to rotate the rotating direction and the rotational speed of the spindle motor 3.

Figure 3:
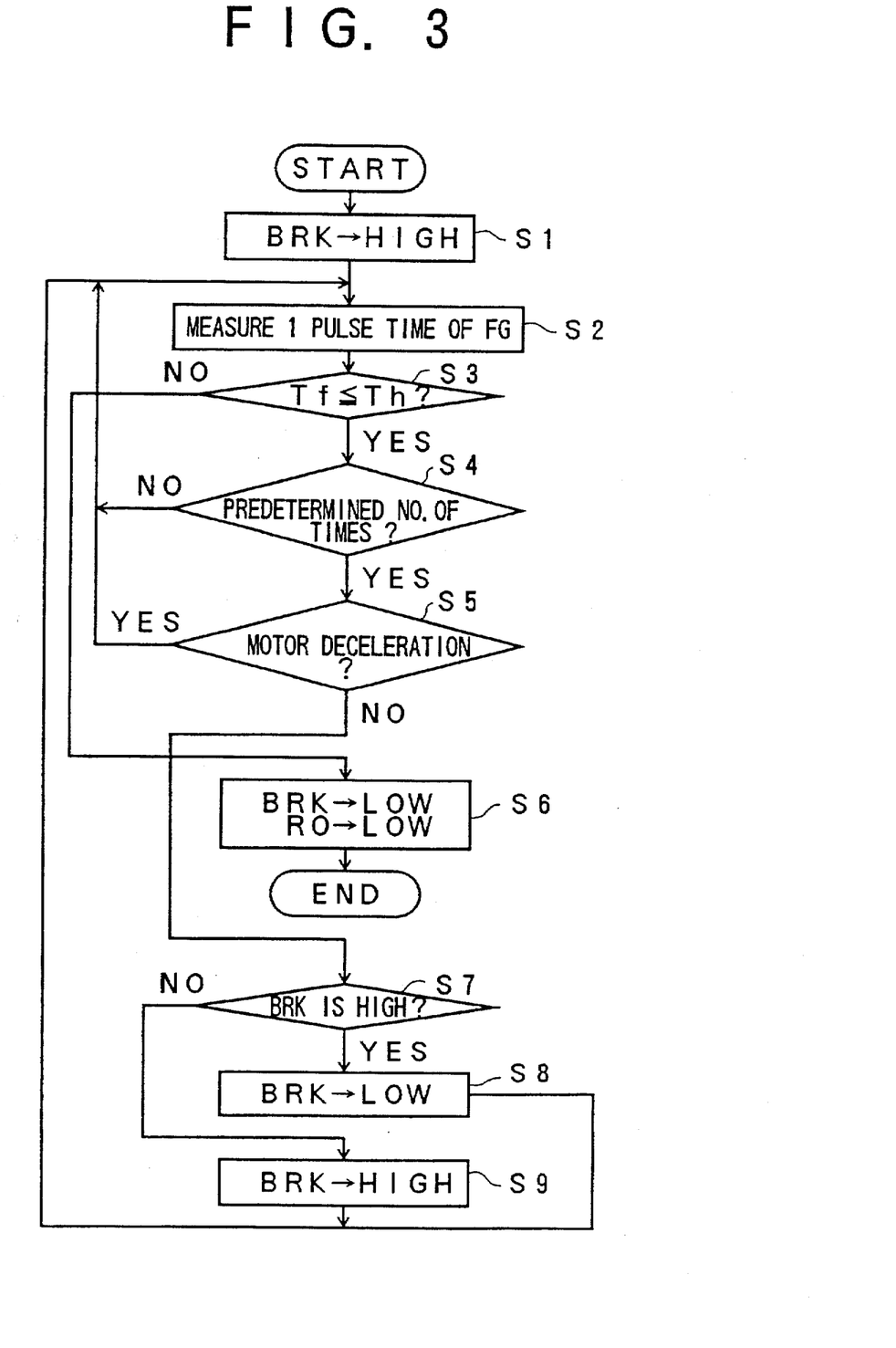
FIG. 3 is a flow chart showing an embodiment of a spindle motor stop operation carried out by a controller.

FIG. 3 is a flow chart showing an embodiment of a spindle motor stop operation carried out by the controller 5 shown in FIG. 1. The spindle motor stop operation shown in FIG.

3 is started in response to the stop instruction, and for the sake of convenience, it is assumed that the spindle motor 3 is undergoing a steady state rotation in this state.

In FIG. 3, a step S1 sets the brake signal BRK to a high level, and a step S2 measures a time of 1 pulse of the frequency generator signal FG obtained from the spindle motor driver 4. A step S3 decides whether or not a measured period Tf of the frequency generator signal FG is shorter than or equal to a reference period Th. If the decision result in the step S3 is NO, it is judged that the spindle motor 3 is stopped, and the process advances to a step S6. The step S6 sets both the brake signal BRK and the rotation signal RO to a low level, and the process ends.

On the other hand, if the decision result in the step S3 is YES, a step S4 decides whether or not the time of 1 pulse of the frequency generator signal FG is measured a predetermined number of times. The process returns to the step S2 if the decision result in the step S4 is NO. If the decision result in the step S4 is YES, a step S5 decides whether or not the spindle motor 3 is decelerating. The process returns to the step S2 if the decision result in the step S5 is YES, so as to repeat the above described process. More particularly, the step S5 compares a maximum value TF(max) of the period Tf of the frequency generator signal FG measured before, for example, and the period Tf of the frequency generator signal FG that is measured the predetermined number of times described above. It is judged that the spindle motor 3 is decelerating if the period Tf of the frequency generator signal FG that is measured the predetermined number of times is greater than the maximum value TF(max).

If the decision result in the step S5 is NO, the spindle motor 3 is making a reverse rotation or is starting to make a reverse rotation. For this reason, if the decision result in the step S5 is NO, the level of the brake signal BRK is inverted and the process returns to the step S2. In other words, if the decision result in the step 85 is NO, a step S7 decides whether or not the brake signal BRK has a high level, and a step S8 sets the brake signal BRK to a low level if the decision result in the step S7 is YES, before the process returns to the step S2. In addition, if the decision result in the step S7 is NO, a step S9 sets the brake signal BRK to a high level, before the process returns to the step S2.

Figure 4:
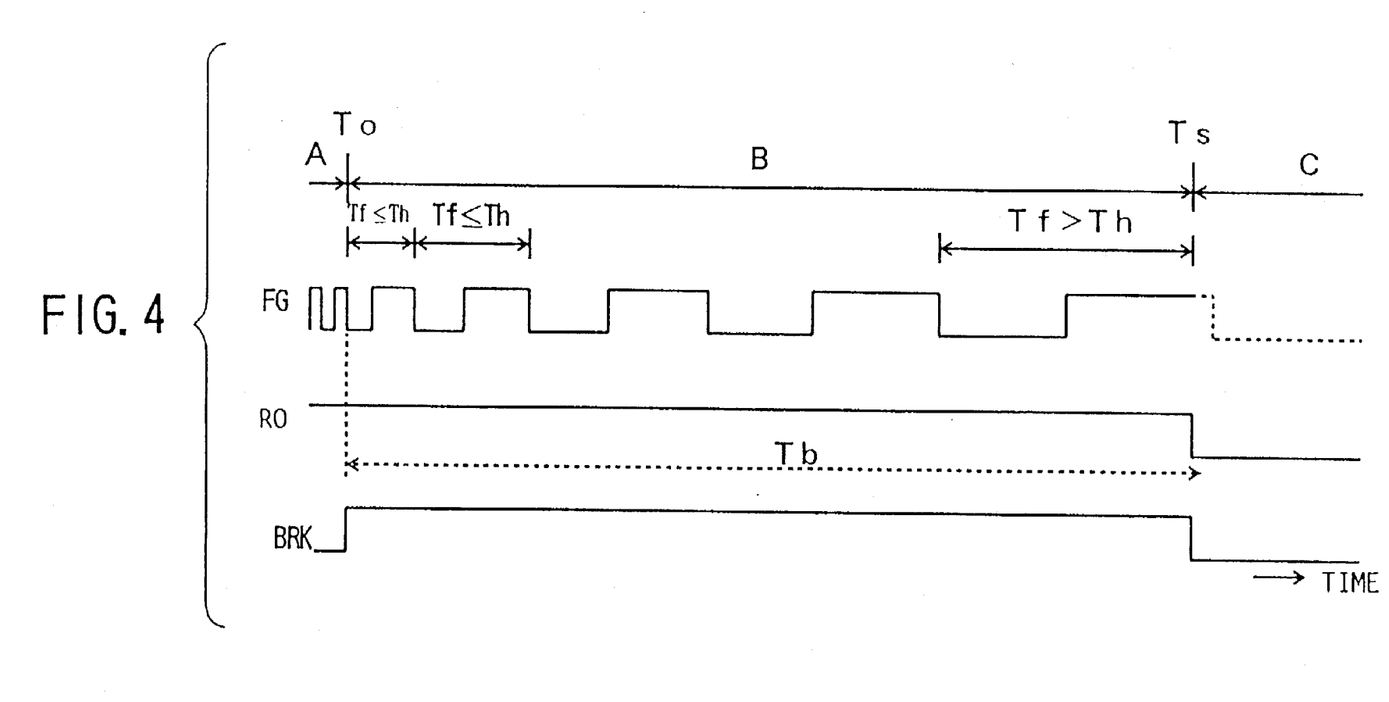
FIG. 4 is a time chart showing timings of a frequency generator signal FG, a rotation signal RO and a brake signal BRK for a case where a spindle motor stops by a single brake operation.

FIG. 4 is a time chart showing timings of the frequency generator signal FG, the rotation signal RO and the brake signal BRK for a case where the spindle motor 3 stops by a single brake operation. As shown in FIG. 4, during an interval A in which the spindle motor 3 is in a steady state rotation state, the frequency generator signal FG makes a transition at a constant period, the rotation signal RO has a high level, and the brake signal BRK has a low level. When the brake signal BRK is set to a high level at a time To, a reverse rotation force is applied to the spindle motor 3, and thus, the rotational speed of the spindle motor 3 gradually decreases during an interval B, while the period Tf of the frequency generator signal FG gradually becomes longer. In FIG. 4, Tb denotes a brake time. Both the rotation signal RO and the brake signal BRK are set to a low level at a time Ts when the period Tf of the frequency generator signal FG exceeds the reference period Th. Accordingly, the spindle motor 3 will not rotate due to inertia or make a reverse rotation during an interval C, and it is possible to positively stop the spindle motor 3 within a short time. For example, the reference period Th may be obtained from results of experiments or by measuring the period Th of the frequency generator signal FG when the spindle motor 3 stops.

Figure 5:
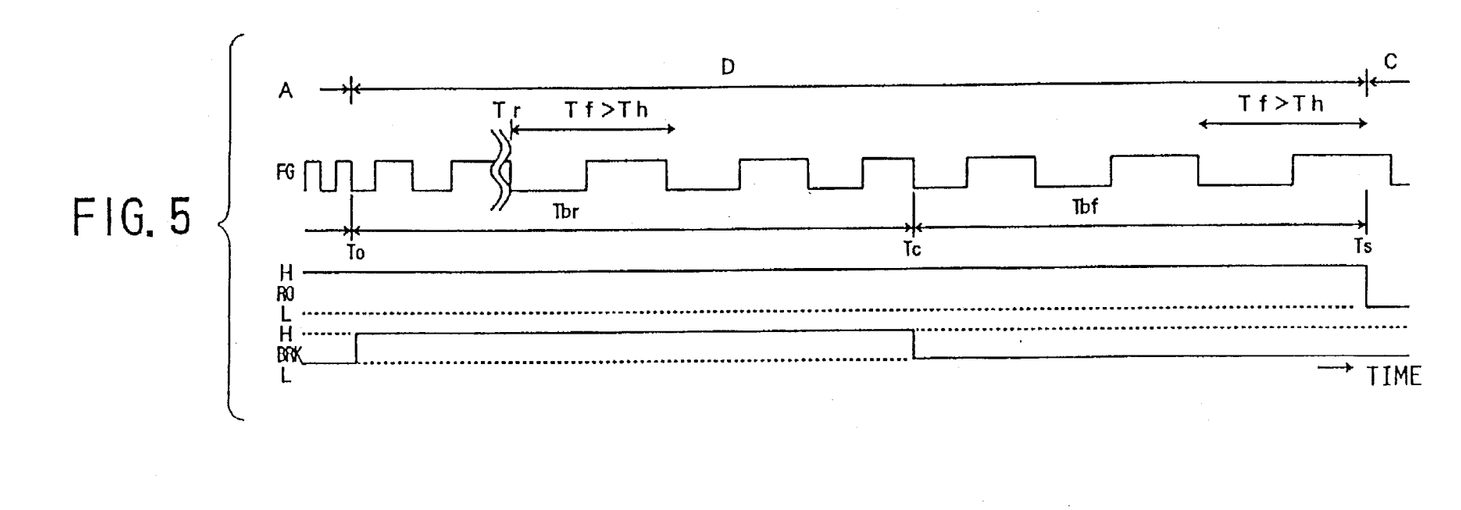
FIG. 5 is a time chart showing timings of the frequency generator signal FG, the rotation signal RO and the brake signal BRK for a case where the spindle motor stops by two brake operations.

FIG. 5 is a time chart showing timings of the frequency generator signal FG, the rotation signal RO and the brake signal BRK for a case where the spindle motor 3 stops by 2 brake operations. As shown in FIG. 5, during an interval A in which the spindle motor 3 is in a steady state rotation state, the frequency generator signal FG makes a transition at a constant period, the rotation signal RO has a high level, and the brake signal BRK has a low level. When the brake signal BRK is set to a high level at a time To, a reverse rotation force is applied to the spindle motor 3, and the rotational speed of the spindle motor 3 gradually decreases during an interval D, while the period Tf of the frequency generator signal FG gradually becomes longer. At a time Tr, the spindle motor 3 starts a reverse rotation, and the period Tf of the frequency generator signal FG gradually becomes shorter. At a time Tc, it is judged that the spindle motor 3 is making a reverse rotation. For this reason, the brake signal BRK is set to a low level at the time Tc, and the rotation signal RO is maintained at the high level, so as to apply a forward rotation force to the spindle motor 3. As a result, because the rotational speed of the spindle motor 3 is already sufficiently slow, it is possible to find a point in time when the period Tf of the frequency generator signal FG exceeds the reference period Th. The rotation signal RO is set to a low level at a time Ts when the period Tf of the frequency generator signal FG exceeds the reference period Th. Therefore, the spindle motor 3 will not make a forward or reverse rotation due to inertia during an interval C, and it is possible to positively stop the spindle motor 3 within a short time. In FIG. 5, Tbr denotes a first brake time, and Tbf denotes a second brake time.

Of course, the number of brake times is not limited to 1 or 2, and it is possible to provide 3 or more brake times.

Figure 6:
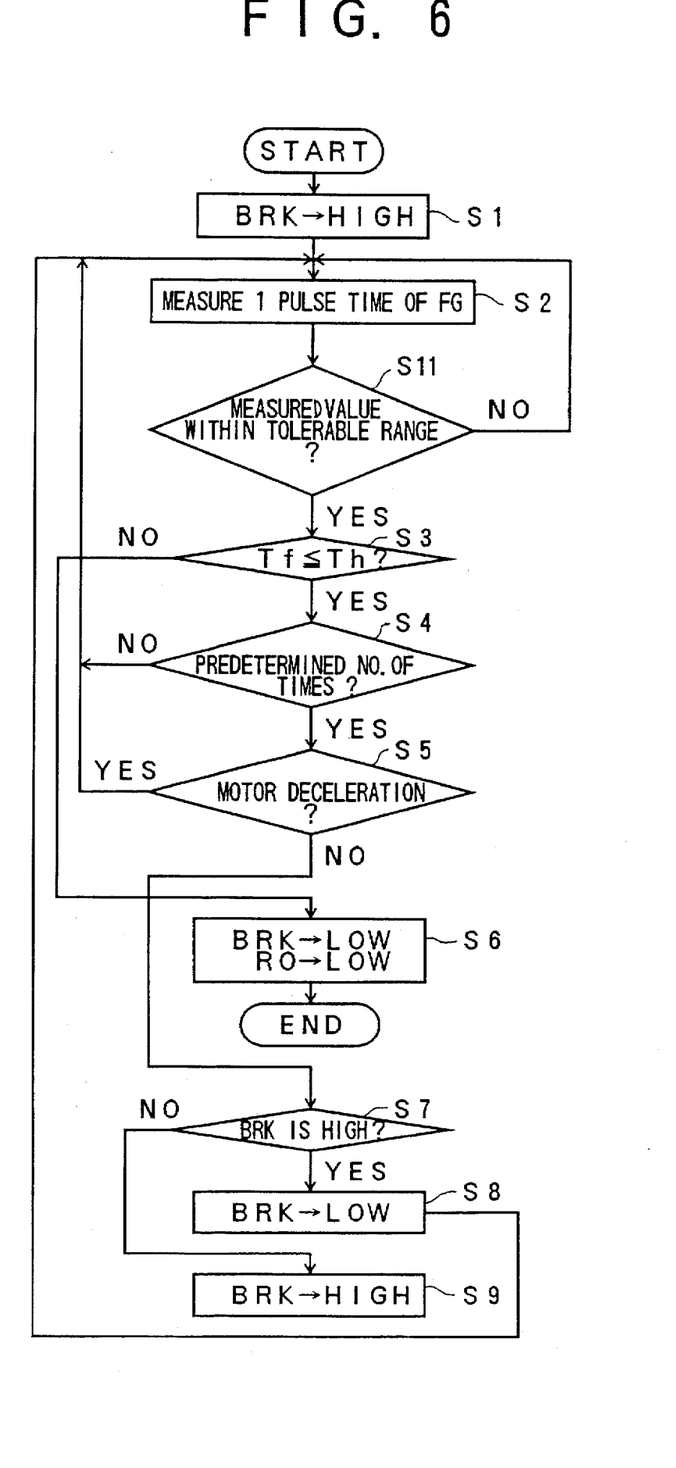
FIG. 6 is a flow chart showing another embodiment of the spindle motor stop operation carried out by the controller.

FIG. 6 is a flow chart showing another embodiment of the spindle motor stop operation carried out by the controller 5 shown in FIG. 1. The spindle motor stop operation shown in FIG. 6 is started in response to the stop instruction, and for the sake of convenience, it is assumed that the spindle motor 3 is making a steady state rotation in this state. In FIG. 6, those steps which are the same as those corresponding steps in FIG. 3 are designated by the same reference numerals, and a description thereof will be omitted.

In FIG. 6, after the step S2, a step S11 decides whether or not the period Tf of the frequency generator signal FG is within a tolerable range. The process returns to the step S2 if the decision result in the step S11 is NO. On the other hand, the process advances to the step S3 if the decision result in the step S11 is YES. Hence, even if an irregular and short pulse appears in the frequency generator signal FG due to the characteristic of the spindle motor driver 4 or the like immediately before the spindle motor 3 stops, for example, it is possible to prevent the spindle motor 3 from being erroneously judged as making a reverse rotation based such a frequency generator signal FG.

Figure 7:
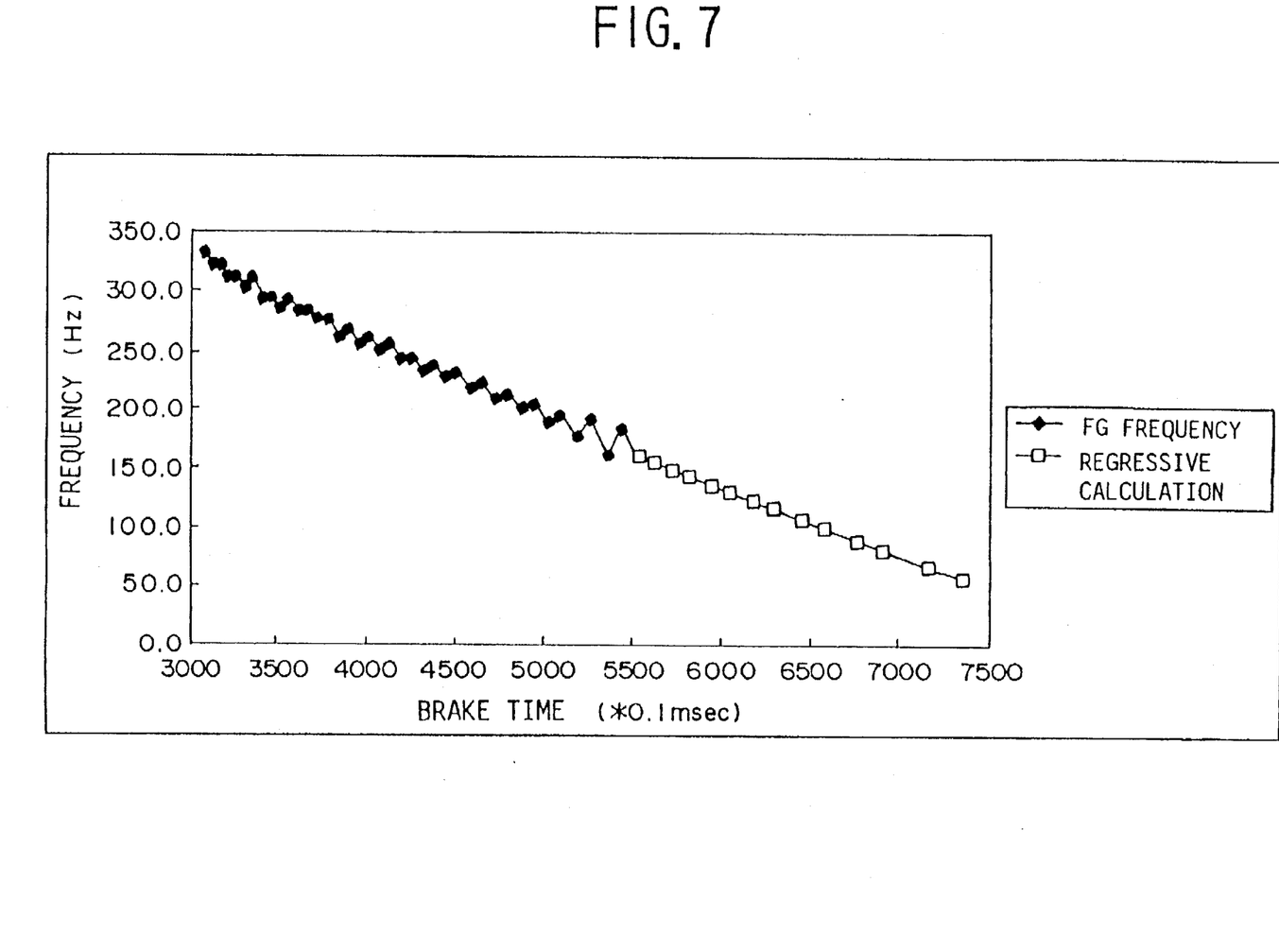
FIG. 7 is a diagram showing a measured result of a relationship of a brake time and a frequency of the frequency generator signal FG during a forward rotation of the spindle motor in the embodiment.
Figure 8:
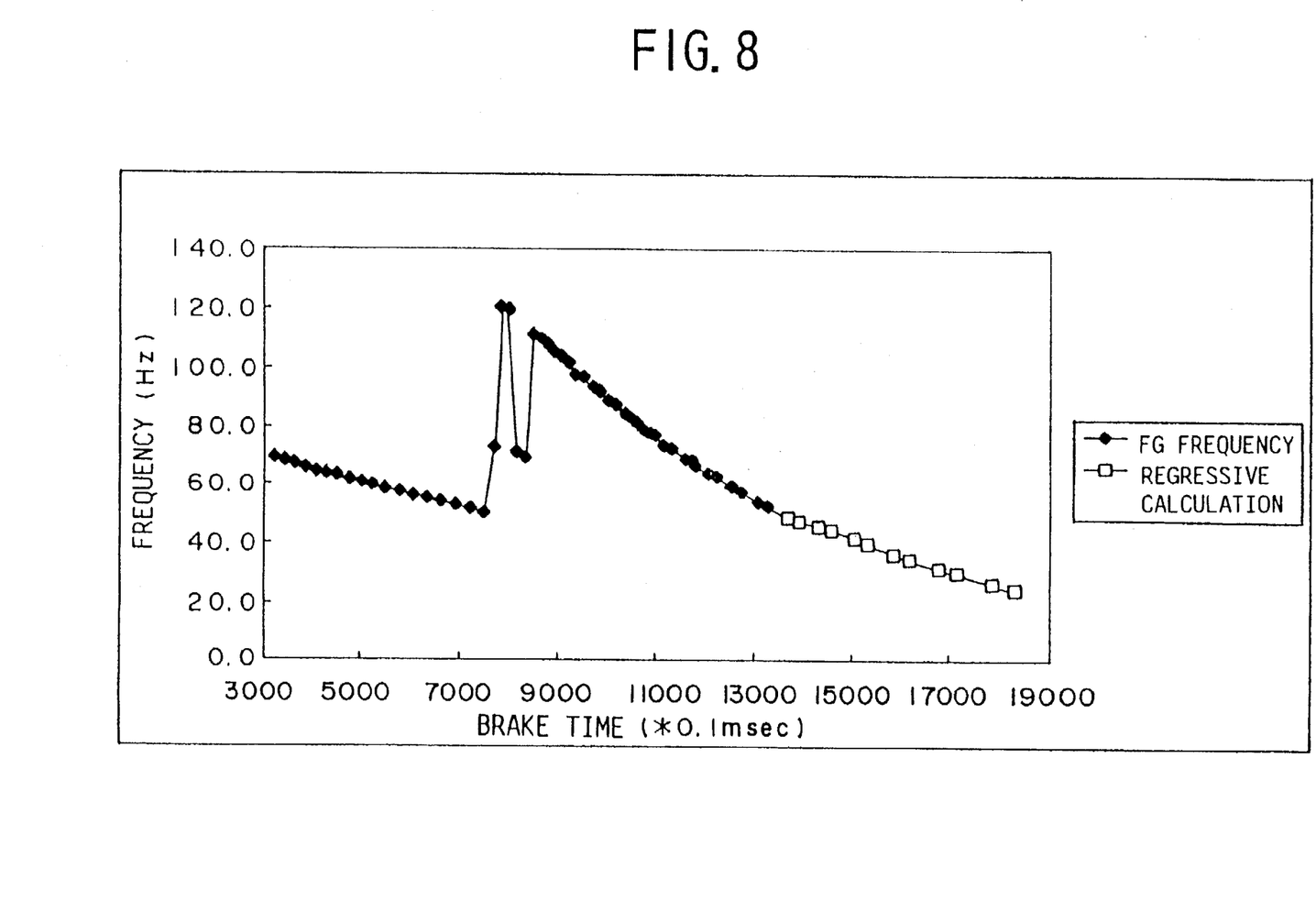
FIG. 8 is a diagram showing a measured result of the relationship of the brake time and the frequency of the frequency generator signal FG during a reverse rotation of the spindle motor in the embodiment.

FIG. 7 is a diagram showing a measured result of a relationship of the brake time and a frequency of the frequency generator signal FG during a forward rotation of the spindle motor 3 in this embodiment. In addition, FIG. 8 is a diagram showing a measured result of a relationship of the brake time and the frequency of the frequency generator signal FG during a reverse rotation of the spindle motor 3 in this embodiment. In FIGS. 7 and 8, the ordinate indicates the frequency of the frequency generator signal FG in Hz, and the abscissa indicates the brake time in ×0.1 msec. In addition, measured results of the frequency of the frequency generator signal FG is indicated by a black diamond-shaped mark, and the frequency of the frequency generator signal FG obtained by a regressive calculation is indicated by a rectangular mark.

Figure 9:
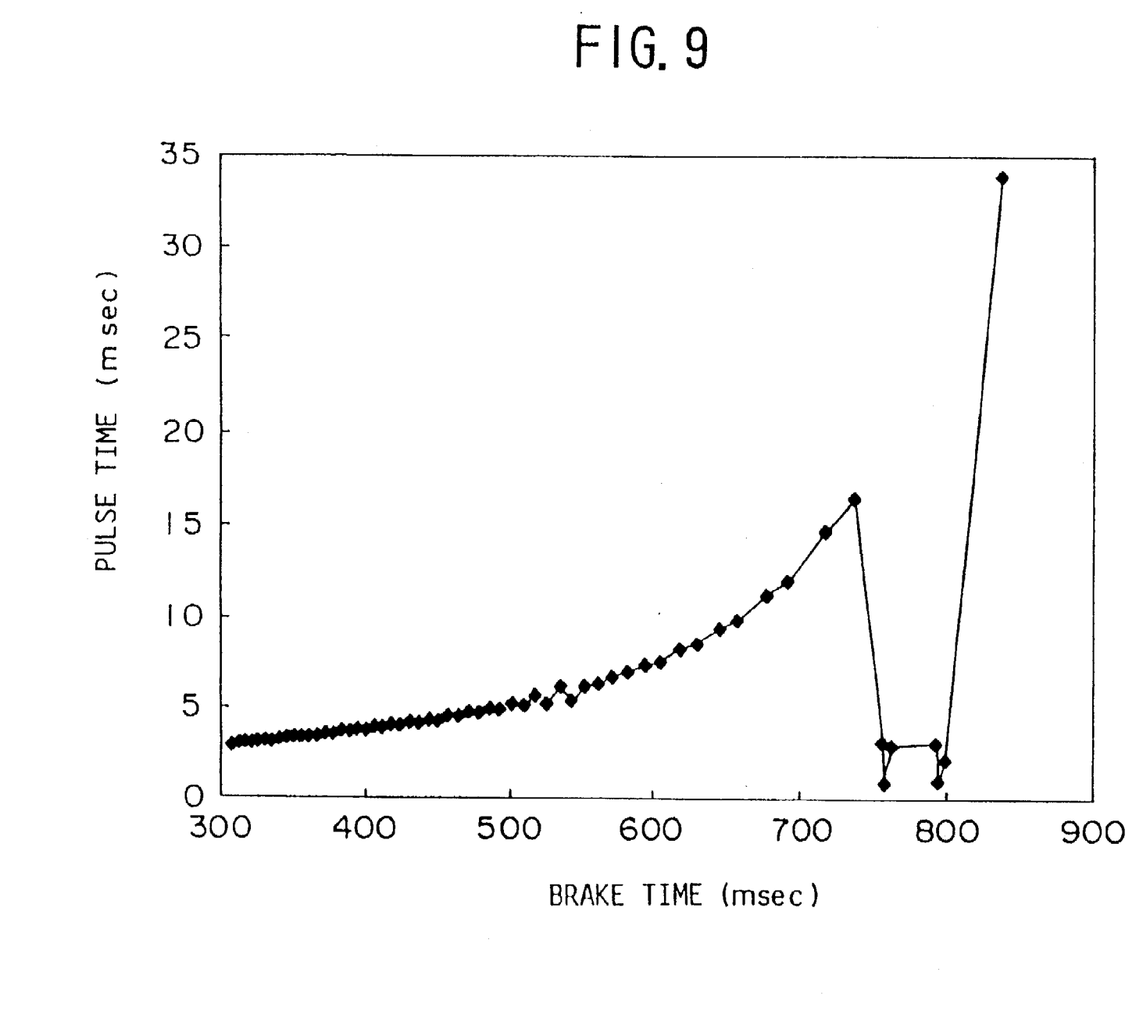
FIG. 9 is a diagram showing a measured result of a relationship of the brake time and a pulse time of the frequency generator signal FG during the forward rotation of the spindle motor in the embodiment.

FIG. 9 is a diagram showing a measured result of a relationship of the brake time and the period of the frequency generator signal FG, that is, a pulse time (duration) of the frequency generator signal FG, during the forward rotation of the spindle motor 3 in this embodiment. In FIG. 9, the ordinate indicates the pulse time of the frequency generator signal FG in msec, and the abscissa indicates the brake time in msec. In addition, since the pulse time of the frequency generator signal FG remains virtually unchanged for approximately 300 msec after the braking is turned ON, the illustration of this portion of the brake time is omitted in FIG. 9.

In FIG. 9, short pulse times of the frequency generator signal FG are measured at portions approximately 700 msec to 800 msec after the braking is turned ON, but this does not indicate a reverse rotation of the spindle motor 3, but is caused by the short pulses of the frequency generator signal FG generated due to the characteristic of the spindle motor driver 4 or the like immediately before the spindle motor 3 stops. After approximately 800 msec from the time when the braking is turned ON, the measured pulse time of the frequency generator signal FG becomes longer than that of immediately before, and it may be seen that the spindle motor 3 is still making a deceleration in the forward rotation state.

When the pulse time of the frequency generator signal FG for turning the braking OFF is set to 30 msec, for example, the braking is turned OFF when the detected pulse time of the frequency generator signal FG exceeds 30 msec while measuring the pulse time of the frequency generator signal FG. In the case shown in FIG. 9, the braking should be turned OFF after approximately 830 msec from the time when the braking is turned ON.

Figure 10:
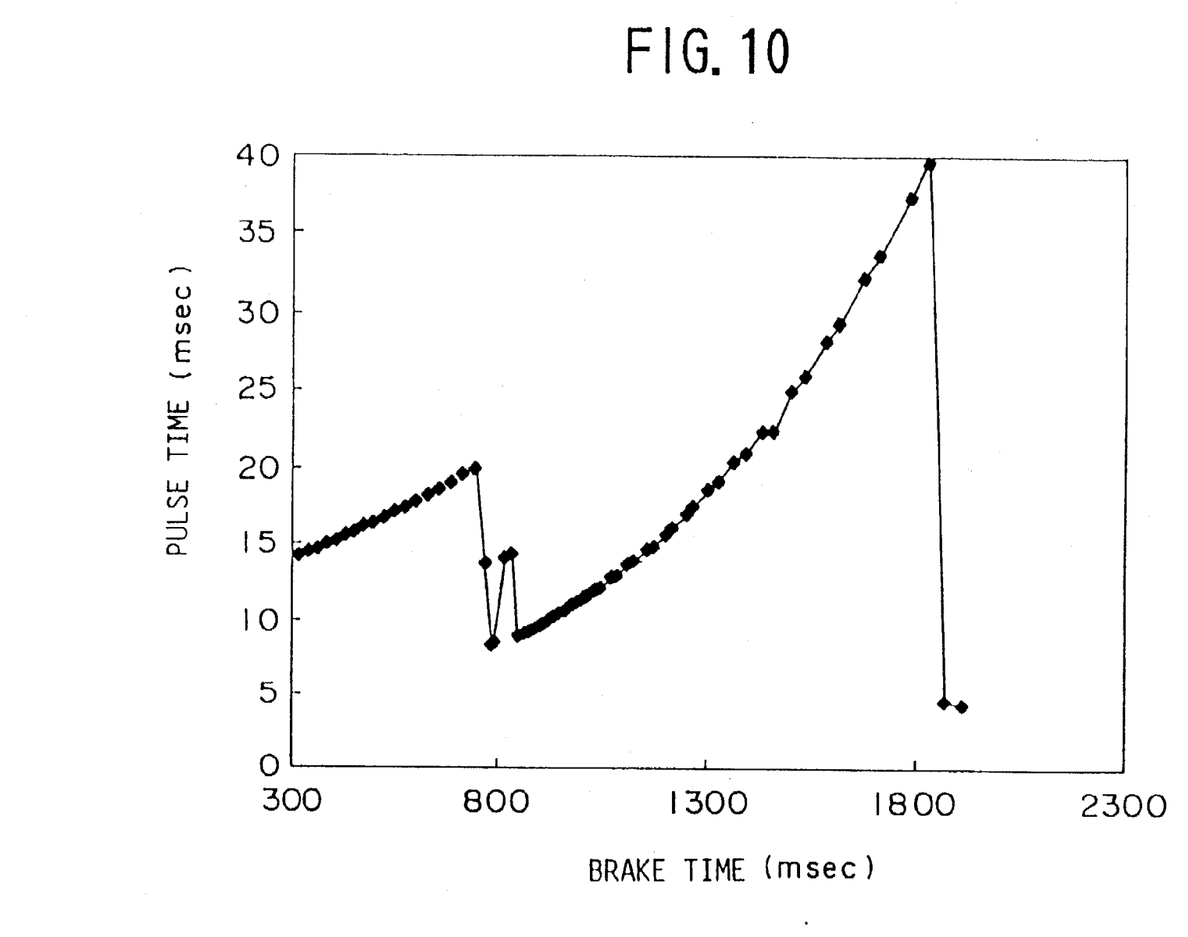
FIG. 10 is a diagram showing a measured result of the relationship of the brake time and the pulse time of the frequency generator signal FG during the reverse rotation of the spindle motor in the embodiment.

FIG. 10 is a diagram showing a measured result of a relationship of the brake time and the period of the frequency generator signal FG, that is, the pulse time (duration) of the frequency generator signal FG, during the reverse rotation of the spindle motor 3 in this embodiment. In FIG. 10, the ordinate indicates the pulse time of the frequency generator signal FG in msec, and the abscissa indicates the brake time in msec. In addition, since the pulse time of the frequency generator signal FG remains virtually unchanged for approximately 300 msec after the braking is turned ON, the illustration of this portion of the brake time is omitted in FIG. 10.

In FIG. 10, short pulse times of the frequency generator signal FG are measured at portions approximately 800 msec to 800 msec after the braking is turned ON, but this does not indicate a reversal of the rotation of the spindle motor 3 in the forward direction, but is caused by the short pulses of the frequency generator signal FG generated due to the characteristic of the spindle motor driver 4 or the like immediately before the spindle motor 3 stops. After approximately 800 msec from the time when the braking is turned ON, the measured pulse time of the frequency generator signal FG becomes longer than that of immediately before, and it may be seen that the spindle motor 3 is still making a deceleration in the reverse rotation state.

When the pulse time of the frequency generator signal FG for turning the braking OFF is set to 35 msec, for example, the braking is turned OFF when the detected pulse time of the frequency generator signal FG exceeds 35 msec while measuring the pulse time of the frequency generator signal FG. In the case shown in FIG. 10, the braking should be turned OFF after approximately 1800 msec from the time when the braking is turned ON.

The disk unit according to the present invention is of course not limited to the optical disk unit of the embodiment described above, and the present invention is similarly applicable to various other kinds of disk units including magneto-optic disk units and magnetic disk units.

Further, the present invention is not limited to these embodiments, but various variations and modifications may be made without departing from the scope of the present invention.

What is claimed is:

1. A spindle motor control method for stopping a spindle motor which rotates in a forward direction in response to a rotation signal, comprising the steps of:

(a) supplying to the spindle motor a brake signal for rotating the spindle motor in a reverse direction when stopping the spindle motor which rotates in the forward direction; and (b) putting the rotation signal and the brake signal to an OFF state when a frequency generator signal FG which indicates a rotational phase of the spindle motor and is generated based on an output of the spindle motor is not detected for a predetermined time.

2. The spindle motor control method as claimed in claim 1, wherein said step (b) puts the rotation signal and the brake signal to the OFF state when a period of the frequency generator signal FG exceeds a predetermined value.

3. The spindle motor control method as claimed in claim 1, wherein said step (b) comprises:

detecting a deceleration of the spindle motor when a period of the frequency generator signal FG is less than a predetermined value; and putting the brake signal to the OFF state when no deceleration is detected.

4. The spindle motor control method as claimed in claim 3, wherein said step (b) detects the deceleration of the spindle motor when the period of the frequency generator signal FG is less than the predetermined value and is greater than a maximum period which is measured previously.

5. The spindle motor control method as claimed in claim 2, wherein said step (b) comprises:

measuring a period of 1 pulse of the frequency generator signal FG; and putting both the rotation signal and the brake signal to the OFF state when the measured period exceeds a predetermined value.

6. The spindle motor control method as claimed in claim 5, which further comprises the steps of:

(c) measuring the period of 1 pulse of the frequency generator signal FG again if the period of 1 pulse of the frequency generator signal FG falls outside a predetermined range.

7. A disk unit comprising:

a spindle motor rotating a disk;

a driver circuit controlling driving of said spindle motor and outputting a frequency generator signal FG which indicates a rotational phase of said spindle motor based on an output of said spindle motor; and a controller supplying to said driver circuit a rotation signal for rotating said spindle motor in a forward direction and a brake signal for reversing a rotating direction of said spindle motor, and controlling rotation and stop of said spindle motor, said controller supplying the brake signal to said driver circuit when stopping said spindle motor which rotates in the forward direction, and putting both the rotation signal and the brake signal to a OFF state when the frequency generator signal FG is not detected for a predetermined time.

8. The disk unit as claimed in claim 7, wherein said controller puts both the rotation signal and the brake signal to the OFF state when a period of the frequency generator signal FG exceeds a predetermined value.

9. The disk unit as claimed in claim 7, wherein said controller comprises:

means for detecting a deceleration said spindle motor when a period of the frequency generator signal FG is less than a predetermined value; and means for putting the brake signal to the OFF state when no deceleration is detected.

10. The disk unit as claimed in claim 9, wherein said controller detects the deceleration of the spindle motor when the period of the frequency generator signal FG is less than the predetermined value and is greater than a maximum period which is measured previously.

11. The disk unit as claimed in claim 8, wherein said controller comprises:

means for measuring a period of 1 pulse of the frequency generator signal FG; and means for putting both the rotation signal and the brake signal to the OFF state when the measured period exceeds a predetermined value.

12. The disk unit as claimed in claim 11, wherein said controller further comprises:

means for measuring the period of 1 pulse of the frequency generator signal FG again if the period of 1 pulse of the frequency generator signal FG falls outside a predetermined range.

* * * * *

UNITED STATES PATENT AND TRADEMARK OFFICE
CERTIFICATE OF CORRECTION

PATENT NO. : 5,894,204
DATED : April 13, 1999
INVENTOR(S) : Hiroshi Kumita

It is certified that error appears in the above-identified patent and that said Letters Patent is hereby corrected as shown below:

Column 4, line 15, after "supplies" insert

--a--

Column 4, line 33, "3" should not be in bold (2nd occurrence)

Column 4, line 62, delete "the-spindle" and insert --the spindle-- therefor

Column 5, line 35, delete "85" and insert

--S5-- therefor

Column 6, line 31, "3" should not be in bold

Column 7, line 47, delete "800" and insert

--700-- therefor

UNITED STATES PATENT AND TRADEMARK OFFICE
CERTIFICATE OF CORRECTION

PATENT NO. : 5,894,204
DATED : April 13, 1999
INVENTOR(S) : Hiroshi Kumita

Page 2 of 2

It is certified that error appears in the above-identified patent and that said Letters Patent is hereby corrected as shown below:

Column 9, line 10, before "said" insert --of-- therefor

Signed and Sealed this

Fourth Day of July, 2000

Attest:

Q. TODD DICKINSON

*Attesting Officer*  *Director of Patents and Trademarks*